United States Patent
Kondo

(10) Patent No.: US 9,503,754 B2
(45) Date of Patent: Nov. 22, 2016

(54) IMAGE ENCODING DEVICE AND IMAGE ENCODING METHOD

(71) Applicant: Hitachi Kokusai Electric Inc., Tokyo (JP)

(72) Inventor: Masatoshi Kondo, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 313 days.

(21) Appl. No.: 14/363,109

(22) PCT Filed: Nov. 29, 2012

(86) PCT No.: PCT/JP2012/080882
§ 371 (c)(1),
(2) Date: Aug. 5, 2014

(87) PCT Pub. No.: WO2013/084781
PCT Pub. Date: Jun. 13, 2013

(65) Prior Publication Data
US 2014/0376620 A1    Dec. 25, 2014

(30) Foreign Application Priority Data
Dec. 7, 2011 (JP) ................... 2011-267675

(51) Int. Cl.
H04N 19/154 (2014.01)
H04N 19/70 (2014.01)
(Continued)

(52) U.S. Cl.
CPC ............ *H04N 19/70* (2014.11); *H04N 19/124* (2014.11); *H04N 19/154* (2014.11); *H04N 19/176* (2014.11); *H04N 19/61* (2014.11); *H04N 19/149* (2014.11); *H04N 19/152* (2014.11)

(58) Field of Classification Search
CPC . H04N 19/176; H04N 19/124; H04N 19/126
See application file for complete search history.

(56) References Cited

U.S. PATENT DOCUMENTS 5,214,507 A   5/1993   Aravind et al.
5,301,242 A   4/1994   Gonzales et al.
(Continued)

FOREIGN PATENT DOCUMENTS

JP    H5-145773 A    6/1993
JP    H6-70311 A     3/1994
(Continued)

OTHER PUBLICATIONS

Budagavi, Madhukar. "Delta QP signaling at sub-LCU level." Joint Collaborative Team on Video Coding (JCT-VC) of ITU-T SG16 WP3 and ISO/IEC JTC1/SC29/WG11, 4th Meeting, Document: JCTVC-D038, Texas Instruments Inc., URL: http://wftp3.itu.int/av-arch/jctvc-site/,, XP. vol. 30008079. 2011.*

(Continued)

*Primary Examiner* — Sath V Perungavoor
*Assistant Examiner* — Clifford Hilaire
(74) *Attorney, Agent, or Firm* — Bacon & Thomas, PLLC

(57) ABSTRACT

Provided are a highly efficient image encoding device which is achieved by quantization of each sub-block in accordance with visual characteristics, and a quantization method that uses the image encoding device. An input image is divided into macro-blocks having a prescribed first size, each of the divided macro-blocks is divided into sub-blocks having a prescribed second size, and each of the sub-blocks is encoded using a same or different quantization parameter for each of the sub-blocks. As a result, by executing quantization for each of the sub-blocks in accordance with the visual characteristics, highly efficient image encoding and image decoding devices can be provided.

6 Claims, 8 Drawing Sheets

(51) Int. Cl.
*H04N 19/176* (2014.01)
*H04N 19/61* (2014.01)
*H04N 19/124* (2014.01)
*H04N 19/149* (2014.01)
*H04N 19/152* (2014.01)

(56) References Cited

U.S. PATENT DOCUMENTS

| | | |
|---|---|---|
| 5,729,294 A | 3/1998 | Linzer et al. |
| 7,792,193 B2 | 9/2010 | Tanizawa et al. |
| 2006/0209952 A1 | 9/2006 | Tanizawa et al. |
| 2010/0074338 A1* | 3/2010 | Yamori ............... H04N 19/139 375/240.16 |

FOREIGN PATENT DOCUMENTS

| | | |
|---|---|---|
| JP | H8-289294 A | 11/1996 |
| JP | 4146444 B | 9/2008 |
| JP | 2011-130050 A | 6/2011 |
| JP | 2011-135269 A | 7/2011 |
| JP | 4768779 B | 9/2011 |
| WO | 2011/064926 A | 6/2011 |

OTHER PUBLICATIONS

International Search Report.

* cited by examiner

FIG. 8

| pic_parameter_set_rbsp( ) { | C | Descriptor |
|---|---|---|
|   pic_parameter_set_id | 1 | ue(v) |
|   seq_parameter_set_id | 1 | ue(v) |
|   entropy_coding_mode_flag | 1 | u(1) |
|   bottom_field_pic_order_in_frame_present_flag | 1 | u(1) |
|   num_slice_groups_minus1 | 1 | ue(v) |
|   if( num_slice_groups_minus1 > 0 ) { | | |
|     slice_group_map_type | 1 | ue(v) |
|     if( slice_group_map_type == 0 ) | | |
|       for( iGroup = 0; iGroup <= num_slice_groups_minus1; iGroup++ ) | | |
|         run_length_minus1[ iGroup ] | 1 | ue(v) |
|     else if( slice_group_map_type == 2 ) | | |
|       for( iGroup = 0; iGroup < num_slice_groups_minus1; iGroup++ ) { | | |
|         top_left[ iGroup ] | 1 | ue(v) |
|         bottom_right[ iGroup ] | 1 | ue(v) |
|       } | | |
|     else if( slice_group_map_type == 3 \|\| | | |
|         slice_group_map_type == 4 \|\| | | |
|         slice_group_map_type == 5 ) { | | |
|       slice_group_change_direction_flag | 1 | u(1) |
|       slice_group_change_rate_minus1 | 1 | ue(v) |
|     } else if( slice_group_map_type == 6 ) { | | |
|       pic_size_in_map_units_minus1 | 1 | ue(v) |
|       for( i = 0; i <= pic_size_in_map_units_minus1; i++ ) | | |
|         slice_group_id[ i ] | 1 | u(v) |
|     } | | |
|   } | | |
|   num_ref_idx_l0_default_active_minus1 | 1 | ue(v) |
|   num_ref_idx_l1_default_active_minus1 | 1 | ue(v) |
|   weighted_pred_flag | 1 | u(1) |
|   weighted_bipred_idc | 1 | u(2) |
|   pic_init_qp_minus26 /* relative to 26 */ | 1 | se(v) |
|   second_qp_delta_mode | 1 | u(2) |
|   if(second_qp_delta_mode_flag!=0) { | | |
|     second_qp_delta | 1 | se(v) |
|   } | | |
|   pic_init_qs_minus26 /* relative to 26 */ | 1 | se(v) |
|   chroma_qp_index_offset | 1 | se(v) |
|   deblocking_filter_control_present_flag | 1 | u(1) |
|   constrained_intra_pred_flag | 1 | u(1) |
|   redundant_pic_cnt_present_flag | 1 | u(1) |
|   if( more_rbsp_data( ) ) { | | |
|     transform_8x8_mode_flag | 1 | u(1) |
|     pic_scaling_matrix_present_flag | 1 | u(1) |
|     if( pic_scaling_matrix_present_flag ) | | |
|       for( i = 0; i < 6 + | | |
|         ((chroma_format_idc !=3) ? 2:6)*transform_8x8_mode_flag; | | |
|         i++ ) { | | |
|         pic_scaling_list_present_flag[ i ] | 1 | u(1) |
|         if( pic_scaling_list_present_flag[ i ] ) | | |
|           if( i < 6 ) | | |
|             scaling_list( ScalingList4x4[ i ], 16, | 1 | |
|               UseDefaultScalingMatrix4x4Flag[ i ] ) | | |
|           else | | |
|             scaling_list( ScalingList8x8[ i - 6 ], 64, | 1 | |
|               UseDefaultScalingMatrix8x8Flag[ i - 6 ] ) | | |
|       } | | |
|     second_chroma_qp_index_offset | 1 | se(v) |
|   } | | |
|   rbsp_trailing_bits( ) | 1 | |
| } | | |

FIG. 9

```
macroblock_layer( ) {
  mb_type
  if( mb_type == I_PCM ) {
    while( !byte_aligned( ) )
      pcm_alignment_zero_bit
    for( i = 0; i < 256; i++ )
      pcm_sample_luma[ i ]
    for( i = 0; i < 2 * MbWidthC * MbHeightC; i++ )
      pcm_sample_chroma[ i ]
  } else {
    noSubMbPartSizeLessThan8x8Flag = 1
    if( mb_type != I_NxN  &&
        MbPartPredMode( mb_type, 0 ) != Intra_16x16  &&
        NumMbPart( mb_type ) == 4 ) {
      sub_mb_pred( mb_type )
      for( mbPartIdx = 0; mbPartIdx < 4; mbPartIdx++ )
        if( sub_mb_type[ mbPartIdx ] != B_Direct_8x8 ) {
          if( NumSubMbPart( sub_mb_type[ mbPartIdx ] ) > 1 )
            noSubMbPartSizeLessThan8x8Flag = 0
        } else if( !direct_8x8_inference_flag )
          noSubMbPartSizeLessThan8x8Flag = 0
    } else {
      if( transform_8x8_mode_flag  &&  mb_type == I_NxN )
        transform_size_8x8_flag
      mb_pred( mb_type )
    }
    if( MbPartPredMode( mb_type, 0 ) != Intra_16x16 ) {
      coded_block_pattern
      if( CodedBlockPatternLuma > 0 &&
          transform_8x8_mode_flag && mb_type != I_NxN &&
          noSubMbPartSizeLessThan8x8Flag &&
          ( mb_type != B_Direct_16x16 || direct_8x8_inference_flag ) )
        transform_size_8x8_flag
    }
    if( CodedBlockPatternLuma > 0 || CodedBlockPatternChroma > 0 ||
        MbPartPredMode( mb_type, 0 ) == Intra_16x16 ) {
      mb_qp_delta
      if(second_qp_delta_mode!=0) {
        second_qp_delta_flag
        if(second_qp_delta_flag == 1) {
          second_qp_delta_map
        }
      }
      residual( 0, 0, 15 )
    }
  }
}
```

FIG.10
(PRIOR ART)

TABLE 10

| COST | QUANTIZATION STEP SIZE |
|---|---|
| COST < THRESHOLD Th | Qstep + ∧ VALUE |
| THRESHOLD Th ≦ COST | Qstep |

FIG.11

TABLE 11

| COST | SUB-BLOCK QUANTIZATION STEP SIZE |
|---|---|
| COST < THRESHOLD Th | Qstep + ∧ VALUE |
| THRESHOLD Th ≦ COST | Qstep |

IMAGE ENCODING DEVICE AND IMAGE ENCODING METHOD

FIELD OF THE INVENTION

The present invention relates to an image encoding technique to compress video data based on pixel correlation and an image decoding technique to expand the encoded data into the video data, and particularly to a quantization technique used to reduce the amount of information.

BACKGROUND OF THE INVENTION

In an image encoding technique such as MPEG-2 and MPEG-4, an encoding is performed by dividing an input picture into macroblocks of 16×16 pixels, the macroblock (hereinafter referred to as "MB") being a basic processing unit. As the encoding performed on the MB basis, a prediction, a transformation, a quantization, and an entropy encoding are well known. Among them, the quantization related to the present invention is performed on each coefficient of an input block based on an arbitrary quantization step size. When setting the quantization step size as Qstep, the input coefficient as C, and the quantization result as Z, an arithmetic expression of a general quantization is represented by Eq. 1 as follows:

$$Z = \text{round}(C/Q\text{step}) \quad \text{Eq. 1}$$

A compression ratio is improved by increasing the quantization step size Qstep. In this case, however, loss of information is increased. The influence of the information loss on image quality degradation depends on the pattern of the MB of interest. Specifically, in a region with a simple pattern such as sky and wall or a region with less motion, it is easy to perceive the image quality degradation. On the other hand, in a region with a complex pattern or a region with intense motion, it is difficult to perceive the image quality degradation. By using such visual characteristics, subjective image quality can be improved by setting a larger quantization step size in the region where it is difficult to perceive the image quality degradation, and conversely setting a smaller quantization step size in the region where it is easy to perceive the image quality degradation (see Patent Document 1 to Patent Document 3)

A conventional control of the quantization step size will be described with reference to FIG. 1. FIG. 1 shows a processing block diagram of a conventional encoding device. Reference numeral "100" denotes an encoding device. Reference numeral "101" denotes a MB division unit. Reference numeral "102" denotes a degradation cost evaluation unit. Reference numeral "103" denotes a quantization step size determination unit. Reference numeral "104" denotes a prediction unit. Reference numeral "105" denotes a transformation unit. Reference numeral "106" denotes a quantization unit. Reference numeral "107" denotes an entropy encoding unit. Reference numeral "108" denotes an inverse quantization unit. Reference numeral "109" denotes an inverse transformation unit. Reference numeral "110" denotes a reconstruction unit.

In FIG. 1, first, the encoding device 100 inputs an input image to the MB division unit 101. The MB division unit 101 divides the input image into blocks (MB) of 16×16 pixels, the block being called a macroblock (MB), and outputs the MBs to the degradation cost evaluation unit 102 and the prediction unit 104. The degradation cost evaluation unit 102 calculates the image quality degradation cost of each of the input MBs, and outputs it to the quantization step size determination unit 103. For example, when a variation in pixel values is defined as the image quality degradation cost, the degradation cost evaluation unit 102 calculates the image quality degradation cost by using the following Eq. 2 and Eq. 3:

$$DC = \text{round}\left(\left(\sum_{y=0}^{15}\sum_{x=0}^{15} MB[x, y]\right)\bigg/ 256\right) \quad \text{Eq. 2}$$

$$\text{COST} = \sum_{y=0}^{15}\sum_{x=0}^{15} \text{abs}(DC - MB[x, y]), \quad \text{Eq. 3}$$

where DC represents an average pixel value in the MB, and COST is the sum of absolute values of differences between the DC and the pixel values and is the image quality degradation cost in this example.

First, the quantization step size determination unit 103 determines a reference quantization step size according to a target bit rate that is inputted from the outside. Subsequently, a quantization step size, which makes the image quality uniform, is obtained based on the image quality degradation cost inputted from the degradation cost evaluation unit 102. In order to determine the quantization step size based on the input image quality degradation cost, for example, a table 10 as shown in FIG. 10 is prepared. In the table 10, Qstep indicates the reference quantization step size. The quantization step size determination unit 103 outputs the determined quantization step size to the quantization unit 106. Further, the quantization step size is set for each MB.

The prediction unit 104 generates a prediction image by using the correlation with neighboring pixels of the MB or the correlation between the current frame and frames before and after the current frame, and outputs a differential image between the prediction image and the MB to the transformation unit 105. The transformation unit 105 transforms the input differential image into 4×4 blocks or 8×8 blocks by using orthogonal transformation such as two-dimensional discrete cosine transform (DCT), and outputs them to the quantization unit 106. The quantization unit 106 quantizes an input transform coefficients based on the quantization step size inputted from the quantization step size determination unit 103, and outputs the quantized transform coefficients to the entropy encoding unit 107 and the inverse quantization unit 108.

The entropy encoding unit 107 transforms encoded control information such as the input quantized transform coefficients and the quantization step size into a bit stream. Further, the entropy encoding unit 107 outputs the amount of codes generated when the information is transformed into the bit stream (generated code amount) to the quantization step size determination unit 103. The quantization step size determination unit 103 monitors whether the generated code amount is equal to a target bit rate and controls to make the generated code amount equal to the target bit rate by finely adjusting the reference quantization step size if the generated code amount is not equal to the target bit rate. Further, a reconstructed image is generated from the quantized transform coefficients through inverse quantization by the inverse quantization unit 108, inverse transformation by the inverse transformation unit 109 and reconstruction by the reconstruction unit 110, and is outputted to the prediction unit 104.

Patent Document 1: International Publication No. WO 2011/064926

Patent Document 2: Japanese Patent Publication No. 4146444

Patent Document 3: Japanese Patent Publication No. 4768779

In image encoding techniques such as MPEG-2 and MPEG-4, the quantization step size is controlled on a MB basis. However, the image to be encoded is an image regardless of boundary of the MB. Accordingly, in the MB located at the boundary of an object present in the image, a complex region and a simple region may be mixed. When setting a smaller quantization step size in the MB located at the boundary of the object, the code amount of the complex region increases and the compression ratio decreases. Conversely, when setting a larger quantization step size in the MB, the image quality degradation of the simple region may be significant.

For example, FIG. 2 is a diagram showing an original image before encoding, and FIG. 3 is a diagram showing an image after encoding. In the encoding with reference to FIGS. 2 and 3, the quantization is performed with a larger quantization step size when a variation in pixel values is large in the MB, and the quantization is performed with a smaller quantization step size when a variation in pixel values is small in the MB. When viewing the image after encoding, degradation of a leaf portion is not significant, but a block noise due to an encoding may be checked at a boundary portion between sky and leaves (portion inside a dashed ellipse).

SUMMARY OF THE INVENTION

In view of the above, the present invention provides an image encoding device and an image encoding method with high efficiency by performing a quantization in each sub-block depending on visual characteristics.

In order to achieve the above object, according to a first aspect of the present invention, an image encoding device is configured to divide an input image into macroblocks each having a predetermined first size, divide each of the macroblocks into sub-blocks each having a predetermined second size, and perform an encoding with a same or different quantization parameter for each of the sub-blocks. Further, a decoding device includes a unit configured to extract quantization step size information on a sub-block basis which is multiplexed into a bit stream, and a unit configured to perform an inverse quantization on a sub-block basis based on the extracted quantization step size information.

According to a second aspect of the present invention, the image encoding device according to the first aspect of the present invention may include an evaluation unit configured to evaluate a degradation cost in each of the sub-blocks, a determination unit configured to determine a quantization step size for an image area of said each of the sub-blocks based on the evaluation unit, and a quantization unit configured to quantize the image area based on the determined quantization step size.

According to a third aspect of the present invention, the image encoding device of the first or the second aspect of the present invention may further include a multiplexing unit configured to multiplex encoded control information with a same or different quantization parameter for each of the sub-blocks into a bit stream.

Further, in order to achieve the above object, according to a fourth aspect of the present invention, an image encoding method includes dividing an input image into macroblocks each having a predetermined first size, dividing each of the macroblocks into sub-blocks each having a predetermined second size, evaluating a degradation cost in each of the sub-blocks, determining a quantization step size for an image area of said each of the sub-blocks based on said evaluating, and quantizing the image area based on the determined quantization step size to perform an encoding with a same or different quantization parameter for each of the sub-blocks.

According to a fifth aspect of the present invention, the image encoding method according to the fourth aspect of the present invention may further include multiplexing encoded control information with a same or different quantization parameter for each of the sub-blocks into a bit stream.

According to the present invention, by performing a quantization in each of sub-blocks depending on the visual characteristics, it is possible to provide an image encoding device and image decoding device with high efficiency.

BRIEF DESCRIPTION OF THE DRAWINGS

FIG. 8 is a diagram showing an example of a picture parameter set to which the syntax of second_qp_delta_mode is added.

FIG. 9 is a diagram showing an example of a MB Layer to which the syntax of second_qp_delta_mode map shown in each of FIGS. 6 and 7 is added.

FIG. 10 is a table for determining a quantization step size based on a conventional image quality degradation cost.

FIG. 11 is a table for determining a sub-block quantization step size based on a sub-block image quality degradation cost value of the present invention.

DETAILED DESCRIPTION OF THE EMBODIMENTS

Figure 1:
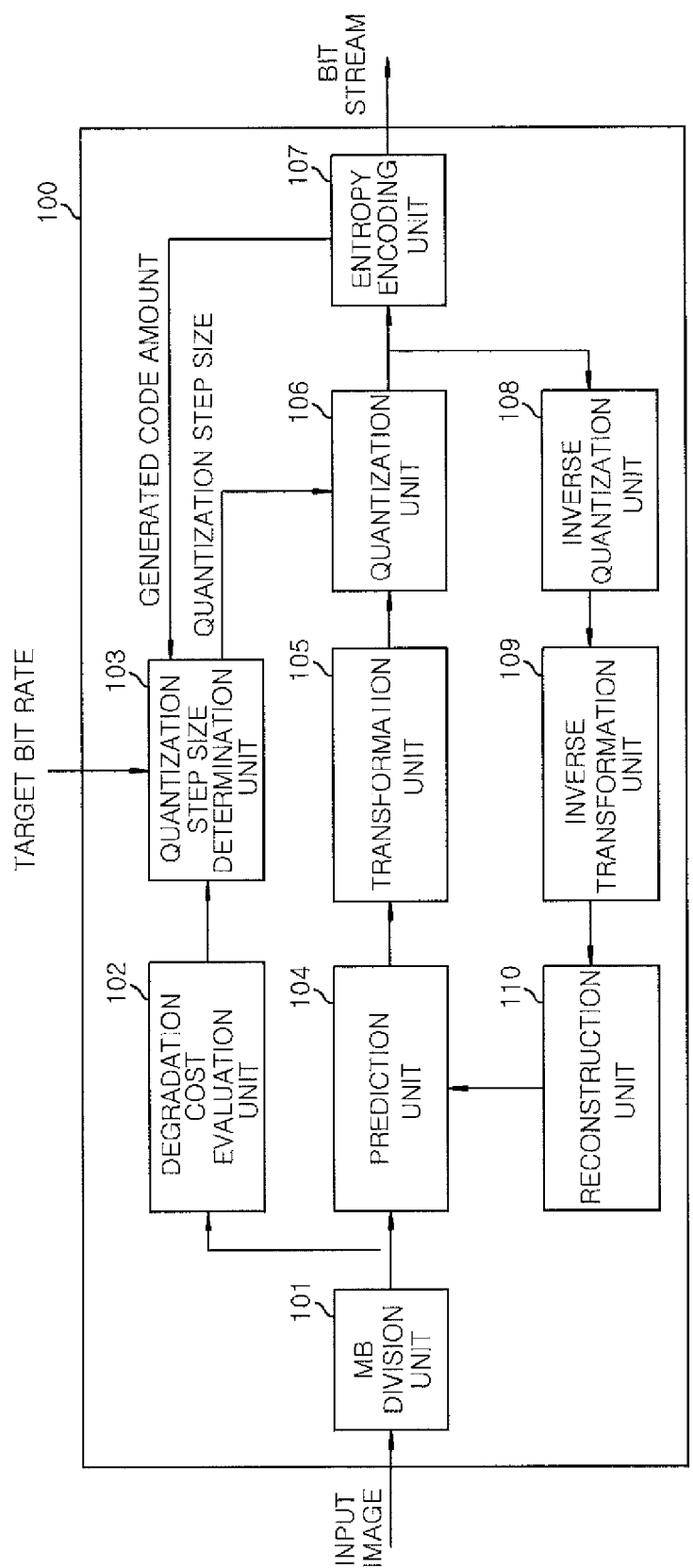
FIG. 1 shows a processing block diagram of a conventional encoding device.
Figure 2:
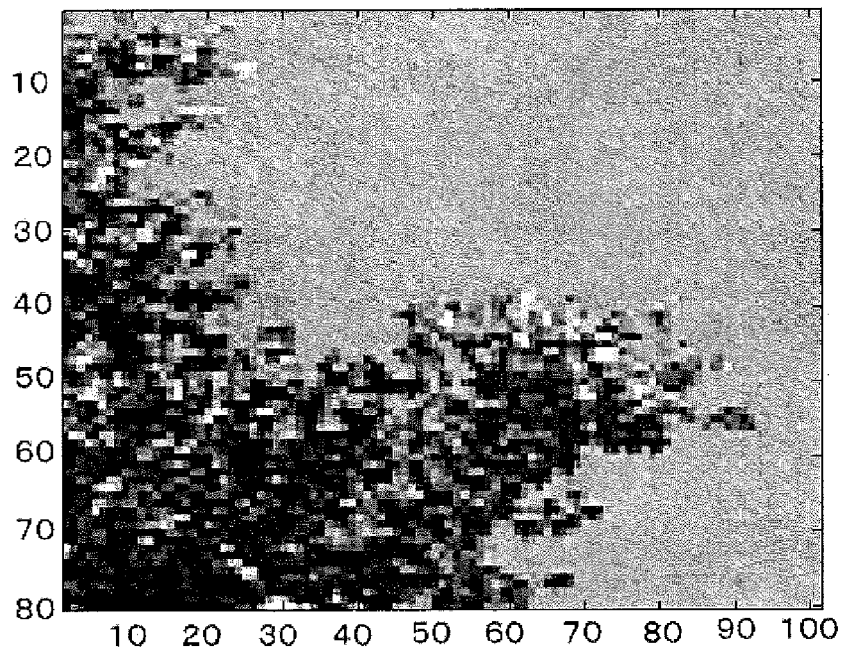
FIG. 2 is a diagram illustrating an original image before a conventional encoding.
Figure 3:
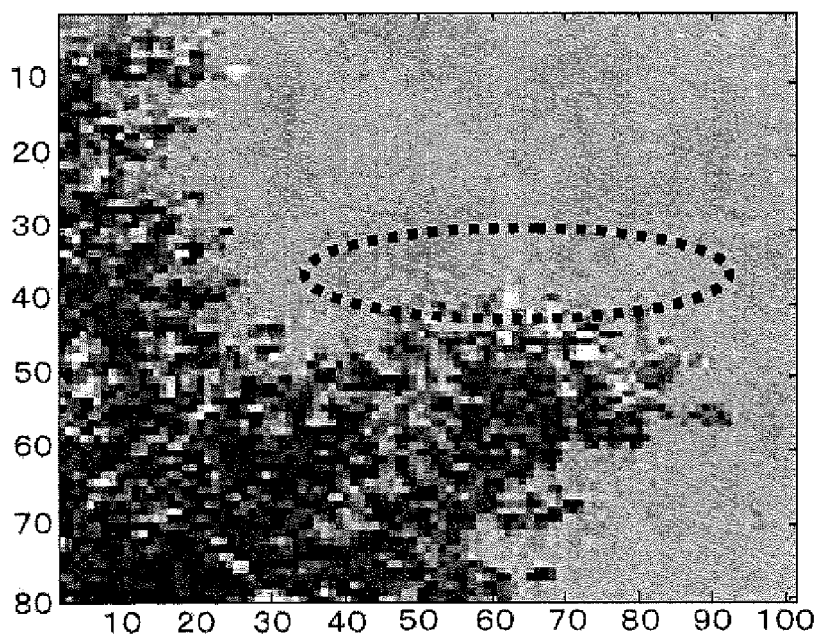
FIG. 3 is a diagram illustrating an image after the conventional encoding.

An encoding device in accordance with an embodiment of the present invention includes a unit configured to set a quantization step size in a MB on the basis of a sub-block of, e.g., 8×8 pixels and performing a quantization. Further, the encoding device includes a unit configured to multiplex the quantization step size set on a sub-block basis into a bit stream. Further, a decoding device includes a unit configured to extract quantization step size information on the sub-block basis which is multiplexed into the bit stream, and a unit configured to perform an inverse quantization on the sub-block basis based on the extracted quantization step size information. One embodiment of the present invention will be described with reference to the drawings. Further, the following description is for the purpose of explaining an exemplary embodiment of the present invention, and is not intended to limit the scope of the present invention. Therefore, since embodiments in which individual elements or all the elements thereof are replaced with equivalent ones can be employed by those skilled in the art, these embodiments are also included in the scope of the present invention. Further, in the following description of the drawings including the drawings described above, components having a common function are denoted by the same reference numeral, and redundant description thereof will be omitted.

Figure 5:
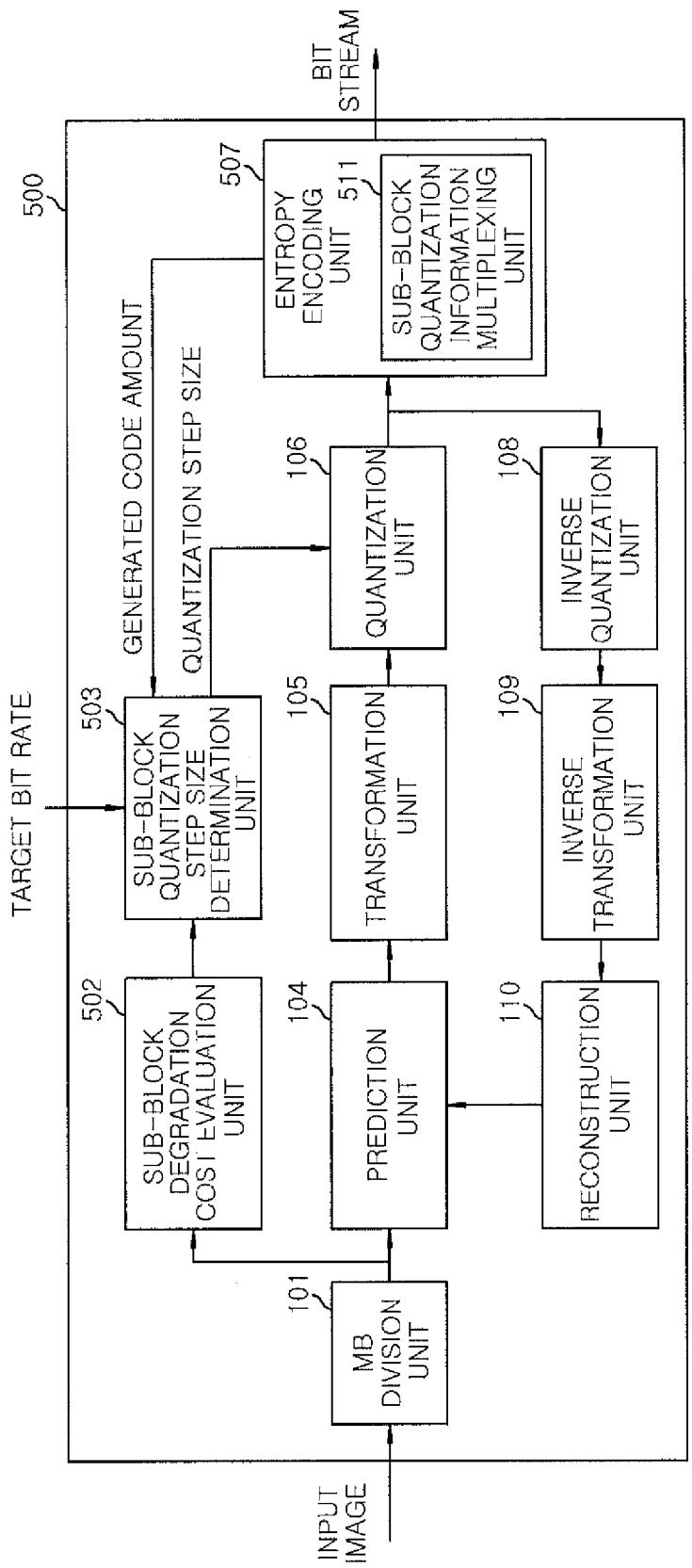
FIG. 5 shows an exemplary processing block diagram of an encoding device of the present invention.

An encoding device in accordance with an embodiment of the present invention will be described with reference to FIG. 5. FIG. 5 is an exemplary processing block diagram of the encoding device of the present invention. Reference numeral "500" denotes the encoding device, reference numeral "502" denotes a sub-block degradation cost evaluation unit, reference numeral "503" denotes a sub-block quantization step size determination unit, reference numeral "507" denotes an entropy encoding unit, and reference numeral "511" denotes a sub-block quantization information multiplexing unit. A configuration of the encoding device 500 of the present invention is different from the configuration of the conventional encoding device 100 in that the encoding device 500 includes the sub-block degradation cost evaluation unit 502 configured to evaluate the degradation cost on a sub-block basis, the sub-block quantization step size determination unit 503 configured to determine the quantization step size on the sub-block basis, and the sub-block quantization information multiplexing unit 511 configured to multiplex the quantization information provided on the sub-block basis in the entropy encoding unit 507.

In FIG. 5, the sub-block degradation cost evaluation unit 502 divides an input MB into sub-blocks each having a size of, e.g., 8×8 pixels, evaluates the degradation cost on a sub-block basis by using the following Eq. 4 and Eq. 5, and outputs the evaluated degradation cost to the sub-block quantization step size determination unit 503. That is, the sub-block degradation cost evaluation unit 502 divides the macroblock into sub-blocks each having a size of 8×8 pixels, and an encoding is performed with a same or different quantization parameter for each of the sub-blocks. The sub-block degradation cost evaluation unit 502 outputs the evaluated degradation cost to the sub-block quantization step size determination unit 503.

$$DC = \text{round}\left(\left(\sum_{y=0}^{7}\sum_{x=0}^{7} \text{Subblock}[x, y]\right)/64\right) \quad \text{Eq. 4}$$

$$COST = \sum_{y=0}^{7}\sum_{x=0}^{7} \text{abs}(DC - \text{Subblock}[x, y]) \quad \text{Eq. 5}$$

The sub-block quantization step size determination unit 503 determines the quantization step size on the sub-block basis from the input degradation cost on the sub-block basis, and outputs the quantization step size to the quantization unit 106. Correspondence of the degradation cost on the sub-block basis and the quantization step size on the sub-block basis is obtained from a table 11 shown in FIG. 11. It is preferable that a threshold Th used in the table 11 shown in FIG. 11 is about one fourth of a threshold Th shown in the conventional example (see FIG. 10). Further, the quantization step size on the sub-block basis is set for each of the sub-blocks of each MB. The quantization unit 106 quantizes the input transform coefficients based on the quantization step size on the sub-block basis inputted from the sub-block quantization step size determination unit 503, and outputs the quantized transform coefficients to the entropy encoding unit 507 and the inverse quantization unit 108.

The entropy encoding unit 507 transforms encoded control information such as the input quantized transform coefficients and the quantization step size into a bit stream. Further, the entropy encoding unit 507 outputs the amount of codes generated when the information is transformed into the bit stream to the quantization step size determination unit 103. That is, the entropy encoding unit 507 multiplexes and outputs control information encoded with a same or different quantization parameter for each of the sub-blocks in the bit stream.

Subsequently, the sub-block quantization information multiplexing unit 511 of the entropy encoding unit 507 will be described. The sub-block quantization information multiplexing unit 511 multiplexes information of Δ value for the quantization step size and information of a sub-block in the MB to which the Δ value will be applied so that they can be correctly decoded in the decoding. First, it is preferable that the Δ value for the quantization step size is multiplexed in a picture header, and fixed in each picture. In an extended embodiment to the H.264 coding standard, syntax of second_qp_delta_mode_flag and second_qp_delta are added to a picture parameter set (see FIG. 8). In this case, second_qp_delta_mode_flag indicates the mode information of quantization control using the Δ value on the sub-block basis. Further, second_qp_delta syntax indicates the Δ value with respect to reference quantization parameter (QP) in the picture.

Subsequently, it is preferable that the information of a sub-block in the MB to which the Δ value will be applied is multiplexed in an MB header. An extended embodiment to the H.264 coding standard is shown in FIG. 9. Two types of syntax such as second_qp_delta_flag and second_qp_delta_map are added to the MB header (see FIG. 9). In this case, second_qp_delta_flag is multiplexed when second_qp_delta_mode of the picture header is not 0. If second_qp_delta_flag is 0, it indicates that quantization in the MB is performed with common QP. If second_qp_delta_flag is 1, it indicates that quantization is performed with the quantization parameter of the sub-block indicated by second_qp_delta_map to be described later, wherein the value of second_qp_delta is added to the quantization parameter. In this case, second_qp_delta_map is a syntax indicating the position of the sub-block which is quantized with a value of QP+Δ and has a code length of 3 bits or 4 bits.

Figure 6:
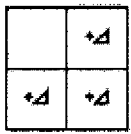
FIG. 6 is a diagram illustrating second_qp_delta_map when second_qp_delta_mode of a picture header is 1.

If second_qp_delta_mode of the picture header is 1, second_qp_delta_map becomes a syntax of 3 bits indicating, e.g., eight patterns, and the mapping is performed as shown in FIG. 6. In the mapping shown in FIG. 6, the eight patterns includes four patterns each having one sub-block to which the Δ value is not applied, and the other four patterns each having two lengthwise adjacent sub-blocks to which the Δ value is not applied or two transversely adjacent sub-blocks to which the Δ value is not applied.

Figure 7:
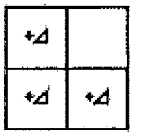
FIG. 7 is a diagram illustrating second_qp_delta_map when second_qp_delta_mode of the picture header is 2.

If second_qp_delta_mode of the picture header is 2, second_qp_delta_map becomes a syntax of 4 bits indicating, e.g., fourteen patterns, and the mapping is performed as shown in FIG. 7.

Figure 4:
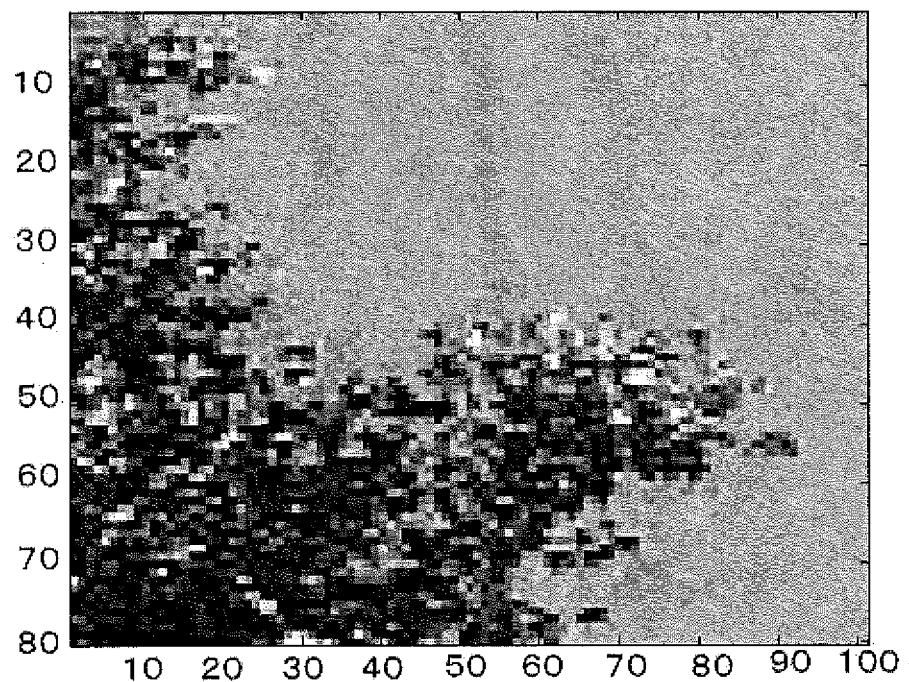
FIG. 4 is a diagram illustrating an encoded image according to the present invention.

By using the above-described embodiment of the present invention, it is possible to control the quantization parameters on a sub-block basis, and encode the MB located at the object boundary with high quality. FIG. 4 shows an encoded image according to the present invention. In the encoding in this embodiment, the MB is divided into sub-blocks of 8×8 pixels, and a variation in pixel values is evaluated on a sub-block basis to control the quantization step size. As a result, by performing the quantization of each sub-block depending on the visual characteristics, an image encoding device and an image encoding method with high efficiency are realized.

INDUSTRIAL APPLICABILITY

The present invention is broadly applicable to video and broadcasting fields and the like requiring an image encoding technique to compress video data by using pixel correlation and an image decoding technique to decompress the compressed encoded data into the video data.

EXPLANATION OF REFERENCE SYMBOLS

100: encoding device
101: MB division unit
102: degradation cost evaluation unit
103: quantization step size determination unit
104: prediction unit
105: transformation unit
106: quantization unit
107: entropy encoding unit
108: inverse quantization unit
109: inverse transformation unit
110: reconstruction unit
500: encoding device
502: sub-block degradation cost evaluation unit
503: sub-block quantization step size determination unit
507: entropy encoding unit
511: sub-block quantization information multiplexing unit

What is claimed is:

1. An image encoding device comprising:
a MB division unit configured to divide an input image into macroblocks each having a first size;
an evaluation unit configured to divide each of the macroblocks into sub-blocks each having a second size and evaluate a degradation cost in each of the sub-blocks;
a determination unit configured to determine a quantization step size for an image of each of the sub-blocks based on the degradation cost evaluated by the evaluation unit;
a quantization unit configured to quantize the image based on the quantization step size determined by the determination unit; and
an encoding unit configured to encode the quantized image and information including the quantization step size for each of the sub-blocks in a syntax,
wherein the determination unit determines the quantization step size by determining whether or not a $\Delta$ value is applied to a reference quantization step size with respect to each of the sub-blocks belonging to each macroblock,
wherein the encoding unit adds a first code indicating which one of the sub-blocks in each of the macroblocks has the $\Delta$ value to the syntax,
wherein the encoding unit adds a second code indicating the $\Delta$ value to a syntax in a picture header, and
wherein the encoding unit selectively uses, as the first code, one of a 3-bits-code indicating eight patterns for the sub-blocks belonging to each macroblock and a 4-bits-code indicating fourteen patterns for the sub-blocks belonging to each macroblock and adds a third code indicating whether the first code is the 3-bits-code or the 4-bits-code to the syntax in the picture header.

2. The image encoding device of claim 1, wherein, in case of dividing each of the macroblocks into four sub-blocks, the eight patterns indicted by the 3-bits-code includes four patterns each having one sub-block to which the $\Delta$ value is not applied and the other four patterns each having two lengthwise adjacent sub-blocks to which the $\Delta$ value is not applied or two transversely adjacent sub-blocks to which the $\Delta$ value is not applied.

3. The image encoding device of claim 1, wherein the quantization unit quantizes a transformed image of a differential image with a prediction image for each of the sub-blocks, the transformed image being transformed by using orthogonal transformation.

4. An image encoding method comprising:
dividing an input image into macroblocks each having a first size;
dividing each of the macroblocks into sub-blocks each having a second size and evaluating a degradation cost in each of the sub-blocks;
determining a quantization step size for an image of each of the sub-blocks based on the degradation cost evaluated by the evaluation unit;
quantizing the image based on the quantization step size determined by the determination unit; and
encoding the quantized image and information including the quantization step size for each of the sub-blocks in a syntax,
wherein, in said determining, the quantization step size is determined by determining whether or not a $\Delta$ value is applied to a reference quantization step size with respect to each of the sub-blocks belonging to each macroblock,
wherein, in said encoding, a first code indicating which one of the sub-blocks in each of the macroblocks has the $\Delta$ value is added to the syntax,
wherein, in said encoding, a second code indicating the $\Delta$ value is added to a syntax in a picture header, and
wherein, in said encoding, one of a 3-bits-code indicating eight patterns for the sub-blocks belonging to each macroblock and a 4-bits-code indicating fourteen patterns for the sub-blocks belonging to each macroblock is selectively used as the first code, and a third code indicating whether the first code is the 3-bits-code or the 4-bits-code is added to the syntax in the picture header.

5. The image encoding method of claim 4, wherein, in case of dividing each of the macroblocks into four sub-blocks, the eight patterns indicted by the 3-bits-code includes four patterns each having one sub-block to which the $\Delta$ value is not applied and the other four patterns each having two lengthwise adjacent sub-blocks to which the $\Delta$ value is not applied or two transversely adjacent sub-blocks to which the $\Delta$ value is not applied.

6. The image encoding method of claim 4, wherein, in said quantizing, a transformed image of a differential image with a prediction image for each of the sub-blocks is quantized, the transformed image being transformed by using orthogonal transformation.

* * * * *